United States Patent [19]

Hedman

[11] 4,219,956
[45] Sep. 2, 1980

[54] WEEDLESS CHANGEABLE PLASTIC LURE

[76] Inventor: Dean L. R. Hedman, 4410 NW. 61st St., Des Moines, Iowa 50322

[21] Appl. No.: 888,853

[22] Filed: Mar. 22, 1978

[51] Int. Cl.² ............................................. A01K 85/00
[52] U.S. Cl. .................................. 43/42.1; 43/42.28; 43/42.39; 43/44.8
[58] Field of Search .................. 43/42.09, 42.1, 42.24, 43/42.28, 42.29, 42.37, 42.38, 42.39, 43.2, 44.8

[56] References Cited

U.S. PATENT DOCUMENTS

| 852,793 | 5/1907 | Ladish | 43/44.8 |
|---|---|---|---|
| 1,538,909 | 5/1925 | Shannon | 43/42.29 |
| 1,820,887 | 9/1931 | Pflueger | 43/42.29 |
| 2,825,174 | 3/1958 | Leinonen | 43/44.8 |
| 3,040,467 | 6/1962 | Norton | 43/42.29 |
| 3,352,051 | 11/1967 | Stewart | 43/42.1 |
| 3,426,467 | 2/1969 | Bryant | 43/42.28 |
| 3,724,116 | 4/1973 | Lindner | 43/42.24 |
| 3,731,419 | 5/1973 | Candy | 43/42.28 |
| 3,748,773 | 7/1973 | Goforth | 43/42.24 |
| 3,863,378 | 2/1975 | Walker | 43/42.28 |
| 3,978,606 | 9/1976 | Riggs | 43/42.24 |
| 4,051,619 | 10/1977 | McClellan | 43/42.24 |

Primary Examiner—Nicholas P. Godici
Attorney, Agent, or Firm—Zarley, McKee, Thomte, Voorhees & Sease

[57] ABSTRACT

A weedless fish lure includes a rearwardly extending retainer received in the forward end of a pliable body member with the hook extending into the midsection of the pliable body member. The pliable body member is maintained in spaced parallel relationship to the shank of the fish lure hook.

9 Claims, 11 Drawing Figures

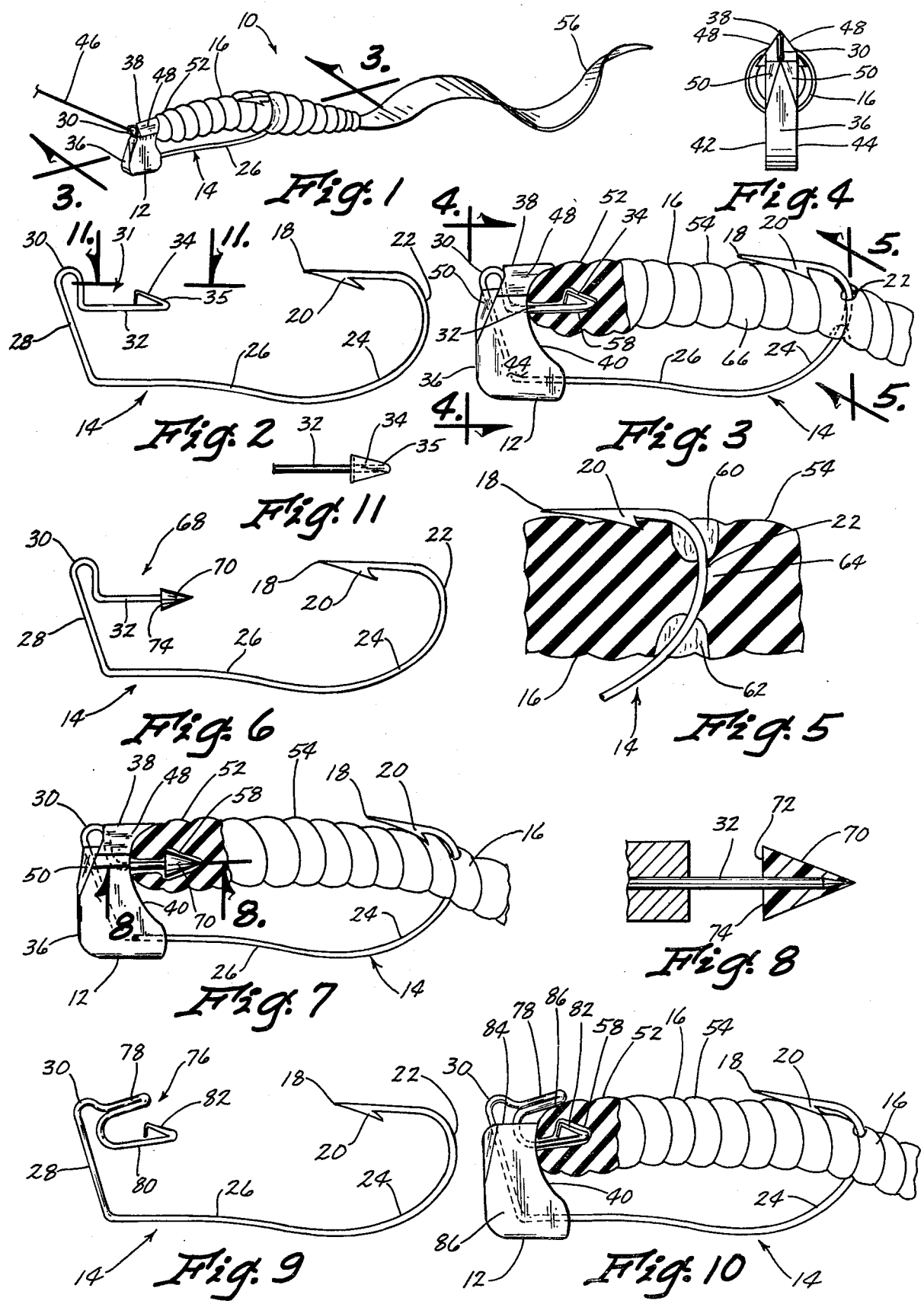

WEEDLESS CHANGEABLE PLASTIC LURE

BACKGROUND OF THE INVENTION

This invention relates to a fish lure and more particularly to a weedless changeable plastic lure that allows quick, easy changing of the body without damage thereto, yet has the hooking capability of a non-weedless lure.

Prior devices encountered difficulty in changing bodies in that the lure had to be removed from the lead line or the body had to be threaded the entire length of the hook resulting in possible damage to the body and inconvenience. Other devices did not provide the combination of effective hook exposure and weedless capabilities. Still other devices required inconvenient removeable parts to effectuate body replacement. Still other lures were susceptible to weed collection by the V formed by the nose and line.

SUMMARY OF THE INVENTION

A weedless changeable plastic lure is disclosed comprising a fish hook element having an eyelet, shank, and an arcuate hook portion with a barbed terminal end, a jig head element attached to the forward portion of the shank adjacent the eyelet, and a pliable body member detachably secured to the head element by a retainer and detachably frictionally secured to the arcuate hook portion extending therethrough. The jig head has a beveled front edge, a beveled top edge, and a concave rear edge with the eyelet abutting the top edge and front edge and residing in the vertical plane of the front edge. The retainer is a rearwardly extending post element with a forwardly extended dull barb element thereon that is received within the forward end of the body member to detachably secure the body member to the concave edge of the jig head. An alternate embodiment of the retainer is a rearwardly extending post with a cone shaped terminal end. Another alternate embodiment of the retainer is a first finger element extending rearwardly from the eyelet to engage the top surface of the body member and a second rearwardly disposed finger member having a blunt barb element for reception by the forward end of the body member. The jig head element for this embodiment has a flat top edge positioned below the eyelet. The forward end of the body member has a recess to receive the retainer for detachable securement thereto, while the middle portion has two opposing tapered recesses with a partition therebetween to receive the hook portion. The hook portion passes through the partition and is frictionally gripped by the partition to aid in maintaining proper alignment of the body member. The pointed end and barb lie contiguously atop the body member to provide the weedless feature. The portion of the arcuate hook portion attached to the shank is closer to the retainer and has a larger radius of curvature than the portion of the hook portion adjacent the barb resulting in an urging upward force against the body member to retain it against the pointed end and barb element. This upward urging force maintains the weedless position of the pointed end atop the body member although the body member is pliable and yieldably displaces to expose the hook and pointed end upon contact with a fish.

It is a principal object of this invention to provide an improved weedless changeable plastic lure.

A further object of the invention is to provide a weedless changeable lure that allows quick and easy changing without damage to the lure body.

A still further object of the invention is to provide a weedless changeable lure that is very weedless, yet has the easy hooking capability of a non-weedless (exposed hook) jig.

A still further object of the invention is to provide a weedless changeable plastic lure wherein the hook is contiguously positioned on the top of the body, yet the body easily displaces to allow full exposure of the hook and barb.

A still further object of the invention is to provide a weedless changeable plastic lure wherein the curvature of the hook yieldably maintains the body and hook in a contiguous relationship.

A still further object of the invention is to provide a weedless changeable plastic lure having an improved jig head resistive to hanging up.

A still further object of the invention is to provide a weedless changeable plastic lure having an improved jig head that is conducive to releasing from hang-ups.

A still further object of the invention is to provide a weedless changeable plastic lure that is resistant to weed collection between the line and jig head.

A still further object of the invention is to provide a weedless changeable plastic lure that can be used with light lines for small fish.

A still further object of the invention is to provide a weedless changeble plastic lure that is easily maneuverable through small passageways.

A still further object of the invention is to provide a weedless changeable plastic lure that is durable in use, economical to manufacture and refined in appearance.

BRIEF DESCRIPTION OF THE DRAWINGS

This invention consists in the construction, arrangements, and combination of the various parts of the device, whereby the objects contemplated are attained as hereinafter more fully set forth, specifically pointed out in the claims, and illustrated in the accompanying drawings.

FIG. 1 is a perspective view of this invention.

FIG. 2 is an enlarged side view of the hook element of FIG. 1.

FIG. 3 is an enlarged partially broken away side view seen on line 3—3 of FIG. 1.

FIG. 4 is a front view seen on line 4—4 of FIG. 3.

FIG. 5 is an enlarged partial sectional view seen on line 5—5 of FIG. 3.

FIG. 6 is a side view similar to FIG. 2 of an alternate embodiment.

FIG. 7 is a partially broken away side view similar to FIG. 3 of the alternate embodiment.

FIG. 8 is an enlarged partial sectional view seen on line 8—8 of FIG. 7.

FIG. 9 is a side view similar to FIG. 2 of another alternate embodiment.

FIG. 10 is a partially broken away side view similar to FIG. 3 of the alternate embodiment.

FIG. 11 is an enlarged top view seen on line 11—11 of FIG. 2.

DESCRIPTION OF THE PREFERRED EMBODIMENT

The numeral 10 generally refers to a weedless changeable plastic lure of this device as shown in FIG. 1.

Lure 10 is comprised of jig head 12, hook member 14, and plastic body element 16.

Hook member 14 is comprised of pointed end 18, barb 20, arcuate middle portion 22, arcuate middle portion 24, shank 26, forward end 28, eyelet 30, and retainer 31 as shown in FIG. 2. Retainer 31 has a rearwardly extending post 32 with a forwardly disposed barb 34 at the end thereof. Barb 34 is relatively dull having a flat surface 35 bent downwardly into contact with post 32 (FIG. 2) for reception within the forward end of body 16 to detachably secure and retain body 16 as shown in FIG. 3 without inflicting damage to the pliable material comprising body 16. The radius of curvature of arcuate hook portion 24 is greater than the radius of curvature of arcuate hook portion 22 to facilitate maintaining the body in the proper position as will be described in more detail below. Also in this regard, the distance from hook portion 24 to retainer 31 is less than the distance from hook portion 22 to retainer 31, thereby further facilitating maintenance of the proper position.

Jig head 12 has a straight forward edge 36, a straight top edge 38, a generally concave rear edge 40 and opposing flat sides 42 and 44 (FIGS. 3 and 4). Forward end 28 of hook member 14 and a portion of shank 26, eyelet 30 and post 32 are encased within jig head 12 as shown in FIG. 3. Eyelet 30 is located at the hypothetical intersection of forward edge 36 and top edge 38 and abuts said edges. The forward portion of eyelet 30 is approximately in the same vertical plane as forward edge 36. This is of critical importance. When line 46 is attached to lure 10 and eyelet 30, there is no structure extending past the point of attachment, and therefore there is no "nose" to form a V-shape in combination with line 46 that is susceptible to collecting weeds. Also, the absence of a "nose" greatly reduces the possibility of a hang-up crosswise in a small crotch in brush.

Beveled surfaces 48 extend downwardly on both sides from top edge 38 and extend rearward from eyelet 30. Beveled surfaces 50 extend rearwardly from forward edge 36 and upwardly toward eyelet 30 (FIGS. 3 and 4). This graduated tapering from the thickness of the eye to the thickness of the head facilitates the lure sliding smoothly through small crotches in brush. Also the beveled surfaces 48 and 50 serve to turn the jig when crosswise in a small crotch so as to align itself to pass through the crotch. Beveled surfaces 48 extend rearwardly to prevent limbs from rubbing the sides 42 and 44 of jig head 12 and pushing body 16 off of retainer 31.

The relative width and height of jig head 12 as shown in FIG. 4 provides the weight distribution necessary for proper balance so that the rearward portion of the lure does not hang down excessively when at rest in the water. The buoyancy of the plastic also raises the rear portion of the lure 10 in cooperation with the balance of jig head 12 to this end. The thickness of jig head 12 is designed to a minimum in order that the jig head can maneuver through small crotches and brush.

Plastic body 16 is composed of forward end 52, middle portion 54, and tail 56. Forward end 52 has as a recess 58 to detachably receive retainer 31 as shown in FIG. 3. Retainer 31 holds forward end 52 in place against concave edge 40, yet is easily detachable without damage to the plastic composition of forward end 52. Two opposing recesses 60 and 62 are located in middle portion 54 of body 16 (FIG. 5). Partition portion 64 of body 16 separates recess 60 from recess 62. Recesses 60 and 62 locate the proper area through which arcuate hook portion 22 is to be passed through body 16 for proper alignment of body 16 on jig head 12 and hook member 14. Since the distance from retainer 31 to arcuate hook portion 22 is greater than the distance from retainer 31 to arcuate hook portion 24 body 16 tends to assume the position of least resistance as shown in FIG. 3. Proper positioning of body 16 is also facilitated by having the distance from recess 60 to forward end 52 slightly greater than the aforementioned distances to result in a urging upward force of body 16 on hook portion 22. This is extremely desirable in that it is necessary for pointed end 18 and barb 20 to contiguously lie atop the outer surface 66 of body 16 to achieve the "weedless" characteristics as the collection of weeds is greatly reduced or eliminated by having pointed end 18 and barb 20 lying contiguously atop outer surface 66. Also contributing to the upward urging of body 16 is the disparity in radius of curvature between arcuate hook portion 22 and arcuate hook portion 24. Partition portion 64 also exerts a retensive frictional gripping force on hook portion 22 to maintain positioning. While this configuration is extremely effective to accomplish the weedless characteristic, the pliable nature of body 16 allows yieldable displacement of middle portion 54 from pointed end 18 and barb 20 for the total exposure necessary to hook the fish. Cooperating with the pliable nature of body 16 to achieve this result is the relative depth of partition portion 64 to recesses 60 and 62. It has been found that the preferable depth of recesses 60 and 62 is one-third the diameter of body 16 with the thickness of partition portion 64 necessarily being one-third also. The one-third thickness of partition portion 64 provides sufficient frictional grip on hook portion 22 to maintain body 16 in the desired position, yet easily yields to expose pointed end 18 upon the nibbling of even very small fish on body 16.

Recesses 60 and 62 are tapered to facilitate threading the hook portion 22 through partition portion 64. A passageway through portion 64 connecting recesses 60 and 62 may be provided to facilitate threading. By marking the proper area for threading, inadvertent stretching or compressing of the plastic body 16 is averted, thereby assuring proper positioning and extending the life of the detachable body member 16.

Retainer 68 shown in FIG. 6 is an alternate embodiment of retainer 31, and comprises a detachable cone element 70 at the end of post 32. Base edges 72 and 74 of cone element 70 provide a balanced retensive engagement within recess 58 of forward end 52 (FIGS. 7 and 8).

Retainer 76 shown in FIG. 9 is another alternate embodiment of retainer 31 and comprises an upper rearwardly extending finger 78 integrally connected to eyelet 30, a lower rearwardly extending post 80 and a forwardly disposed blunt barbed element 82. Finger 78 and lower post 80 are rearwardly extending and generally parallel. The top edge 84 of jig head 86 is located below eyelet 30, such that top finger 78 engages the top surface 88 of forward end 52 as shown in FIG. 10.

In operation, body 16 may be quickly and easily removed and replaced by variations thereof without damage to the pliable material of body 16. Forward end 52 is easily detached from either retainer 31, 68 or 76 by displacing forward end 52 rearwardly.

Hook member 14 is then disengaged from the middle portion 52 of body 16 by threading middle portion 54 over arcuate hook portion 22, barb 20 and pointed end 18. Due to the tapered recesses 60 and 62, only partition portion 64 has to be threaded over the aforementioned portions of hook member 14, thereby greatly reducing any possible damage to body 16. The process is then repeated in reverse for the replacement of a new body 16. Replacement is quick and easy with no loose parts to break or lose and the recesses 58, 60 and 62 guarantee proper alignment of body 16 to insure the weedless nature of lure 10.

Thus, it can be seen that this device accomplishes at least all of its stated objectives.

What is claimed is:

1. A weedless fish lure comprising, a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion, a pliable body member having forward and rearward ends with a middle portion therebetween, and retainer means extending rearwardly from said head element into the forward end of said body member to detachably secure said forward end to said head element with said hook portion extending into said middle portion of said body member, said retainer means comprising a first finger element extending rearwardly from said eyelet to engage the top of said forward end of said body member and a second finger element extending rearwardly from said head element and terminating in a forwardly disposed member extending into the forward end of said body member.

2. A weedless fish lure comprising, a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion, a jig head element connected to said forward end of said shank portion adjacent said eyelet, a pliable body member having forward and rearward ends with a middle portion therebetween, and retainer means extending rearwardly from said head element into the forward end of said body member to detachably secure said forward end to said head element with said hook portion extending into said middle portion of said body member, said retainer means comprising a first finger element extending rearwardly from said eyelet to engage the top of said forward end of said body member and a second finger element extending rearwardly from said head element and terminating in a forwardly disposed member extending into the forward end of said body member.

3. The device of claim 2 wherein said middle portion of said body member has two oppositely disposed recesses therein with a partition portion therebetween, said hook portion extending through said recesses and said partition portion in frictionally retensive contact with said partition portion so that said barb element lies contiguously atop said body member in a rearward disposition with said middle portion adjacent said barb element being yieldably displaceable to expose said pointed end and said barb element.

4. The device of claim 2 wherein said arcuate hook portion comprises a first middle portion connected to said pointed end and a second middle portion connected to said first middle portion and said rearward end of said shank portion, and a first distance between said retainer means and said first middle portion is greater than a second distance between said retainer means and said second middle portion to urge said middle portion of said body element against said pointed end and said barb element.

5. The device of claim 2 wherein said jig head element comprises a front edge and a top edge adjacent said eyelet, said front edge being approximately in the vertical plane of said eyelet so that said front edge does not protrude substantially forward of said eyelet.

6. The device of claim 5 wherein said top edge is beveled downwardly and said front edge is beveled rearwardly.

7. A weedless fish lure comprising, a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion, a pliable body member having forward and rearward ends with a middle portion therebetween and said body member having a longitudinal center axis, retainer means on said forward end of said hook means extending rearwardly towards said hook portion in spaced substantially parallel relation to said shank, said retainer means having a free end extending into the forward end at the center longitudinal axis of said body member and terminating rearwardly on said longitudinal center axis with said hook portion extending into the middle portion of said body member so that said body member is maintained in substantially parallel spaced relation to said shank member between the forward end of said hook means and the hook portion and an open space is provided between said body member and said shank portion, and said arcuate hook portion comprising a first middle portion connected to said pointed end and a second middle portion connected to said first middle portion and said rearward end of said shank portion, and a first distance between said retainer means and said first middle portion is greater than a second distance between said retainer means and said second middle portion to urge said middle portion of said body element against said pointed end and said barb element.

8. The device of claim 7 wherein said retainer means comprises a post element terminating in a forwardly disposed blunt barb member.

9. The device of claim 7 wherein said retainer means extends rearwardly from said eyelet.

* * * * *